US012541972B2

(12) United States Patent
Gao et al.

(10) Patent No.: US 12,541,972 B2
(45) Date of Patent: Feb. 3, 2026

(54) COMPUTING DEVICE AND METHOD FOR HANDLING AN OBJECT IN RECORDED IMAGES

(71) Applicant: Telefonaktiebolaget LM Ericsson (publ), Stockholm (SE)

(72) Inventors: Jiangning Gao, Solna (SE); Rerngvit Yanggratoke, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 18/032,016

(22) PCT Filed: Oct. 16, 2020

(86) PCT No.: PCT/SE2020/050995
§ 371 (c)(1),
(2) Date: Apr. 14, 2023

(87) PCT Pub. No.: WO2022/081056
PCT Pub. Date: Apr. 21, 2022

(65) Prior Publication Data
US 2023/0343089 A1   Oct. 26, 2023

(51) Int. Cl.
*G06V 20/10* (2022.01)
*B64U 101/30* (2023.01)
(Continued)

(52) U.S. Cl.
CPC .............. *G06V 20/176* (2022.01); *G06T 7/30* (2017.01); *G06T 7/70* (2017.01); *G06V 10/225* (2022.01);
(Continued)

(58) Field of Classification Search
CPC .... G06V 20/176; G06V 10/225; G06V 10/25; G06V 10/761; G06V 20/17;
(Continued)

(56) References Cited

U.S. PATENT DOCUMENTS

| 9,996,818 | B1 | 6/2018 | Ren et al. |
| 10,186,049 | B1 | 1/2019 | Boardman et al. |

(Continued)

OTHER PUBLICATIONS

Mallick, Satya, "GOTURN : Deep Learning based Object Tracking", https://www.learnopencv.com/goturn-deep-learning-based-object-tracking/, Jul. 22, 2018, 14 pages.
(Continued)

*Primary Examiner* — Chineyere Wills-Burns
*Assistant Examiner* — Lucius Cameron Gree Allen
(74) *Attorney, Agent, or Firm* — Murphy, Bilak & Homiller, PLLC

(57) ABSTRACT

Embodiments herein disclose a method performed by a computing device (11) for handling an object in one or more recorded images of a structure. The computing device (11) receives from one or more mobile devices (15), at least two recorded images of the structure. The computing device (11) aligns the at least two recorded images vertically and/or horizontally based on the structure and/or an object in the at least two recorded images. The computing device (11) further computes a location similarity of the object in the at least two recorded images by comparing location values of the object in the aligned at least two recorded images, and computes a visual similarity of the object in the at least two recorded images by comparing visual characteristics of the object. The computing device (11) further determines whether the object is the same or not in the at least two recorded images.

14 Claims, 7 Drawing Sheets

(51) Int. Cl.
*G06T 7/00* (2017.01)
*G06T 7/30* (2017.01)
*G06T 7/33* (2017.01)
*G06T 7/70* (2017.01)
*G06V 10/22* (2022.01)
*G06V 10/25* (2022.01)
*G06V 10/74* (2022.01)
*G06V 10/80* (2022.01)
*G06V 20/17* (2022.01)

(52) U.S. Cl.
CPC ............ *G06V 10/25* (2022.01); *G06V 10/761* (2022.01); *G06V 20/17* (2022.01); *G06T 2207/10032* (2013.01); *G06T 2207/30184* (2013.01); *G06T 2207/30242* (2013.01)

(58) Field of Classification Search
CPC .......... G06V 10/811; G06T 7/30; G06T 7/70; G06T 2207/10032; G06T 2207/30184; G06T 2207/30242; G06T 7/0004; G06T 2207/20084; G06T 7/33; B64U 2101/30
USPC ....................................................... 382/103
See application file for complete search history.

(56) References Cited

U.S. PATENT DOCUMENTS

| | | | | |
|---|---|---|---|---|
| 12,045,068 | B2* | 7/2024 | Jones | G01M 5/0033 |
| 2005/0058321 | A1 | 3/2005 | Buehler | |
| 2007/0239683 | A1* | 10/2007 | Gallagher | G06V 10/763 |
| 2014/0140625 | A1* | 5/2014 | Zhang | G06V 20/30 |
| | | | | 382/195 |
| 2018/0075649 | A1 | 3/2018 | Godwin et al. | |
| 2018/0255465 | A1* | 9/2018 | Priest | G06V 20/17 |
| 2019/0011920 | A1* | 1/2019 | Heinonen | G05D 1/0094 |
| 2019/0050685 | A1 | 2/2019 | Kaminski et al. | |
| 2019/0130189 | A1 | 5/2019 | Zhou et al. | |
| 2019/0188521 | A1 | 6/2019 | Barzelay et al. | |
| 2019/0206066 | A1 | 7/2019 | Saleemi et al. | |
| 2020/0019752 | A1 | 1/2020 | Frei et al. | |
| 2020/0082168 | A1 | 3/2020 | Fathi et al. | |
| 2021/0049782 | A1* | 2/2021 | Zhai | G06T 7/136 |
| 2022/0130145 | A1* | 4/2022 | Connary | G05D 1/101 |

OTHER PUBLICATIONS

Rosebrock, Adrian , "OpenCV People Counter", https://www.pyimagesearch.com/2018/08/13/opencv-people-counter/, Aug. 13, 2018, 183 pages.

* cited by examiner

COMPUTING DEVICE AND METHOD FOR HANDLING AN OBJECT IN RECORDED IMAGES

TECHNICAL FIELD

Embodiments herein relate to a computing device and a method performed therein. Furthermore, a computer program product and a computer-readable storage medium are also provided herein. In particular, embodiments herein relate to handling an object in one or more recorded images. For example, handling the object when counting the object of the structure. The structure may, for example, be a communication installation such as an antenna site or a building.

BACKGROUND

In a typical communications network, mobile devices, also known as wireless communication devices, mobile stations, aerial devices, vehicles, stations (STA) and/or wireless devices, communicate with one or another or with a server or similar via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node. The radio network node may comprise one or more antennas providing radio coverage over one or more cells. The one or more antennas may be mounted on a radio tower or another structure to enhance the coverage.

Remote site inspections, e.g., on radio base stations, power lines, as well as infrastructure inspections in general, are crucial for ensuring continuous operations and streamlined delivery of services. However, as site inspections are currently performed to a great extent manually by technicians and field service operations units, they are considered time-consuming, and expensive activities. Also, this process need a site visit or even climbing up the Telecom structure, for example tower and building, which is very time-consuming and dangerous. Therefore, as professional-grade Unmanned Aerial Vehicles (UAV) inspection technologies and Mobile Inspection Devices (MID) become widely available they can be seen as more agile, cost-effective, safer and efficient solutions which can help when carrying out remote site inspection tasks.

Such vehicle survey images are collected for a particular site from several horizontal orbits around the site or structure to be inspected. For each orbit, e.g. a circulation around each segment of a tower, multiple view-points are collected, which are approximately 50-100 images collected. A problem using images is to obtain a telecom equipment inventory accurately, e.g., accurate counting of telecom equipment from these images. For example, from all the images, it is desirable to know accurately the number of antennas, RRUs, microwaves, etc. for that particular site.

There are two existing solutions to the problem. The first solution is to perform manual counting by humans. In other words, a person will be tasked to look through all images from different angles and counting all telecom equipment.

The second solution is a counting algorithm based on object tracking or its variants O.C.P. Counter, "Open CV People Counter," by Adrian Rosebrock [Online]. Available: https://www.pyimagesearch.com/2018/08/13/opencv-people-counter/, published 20180813. Based on object detection results, it performs identification of objects across consecutive video frames by using centroid trackers, correlation filters, Kalman filters, or a recent deep learning-based tracker like GOTURN, "GOTURN: Deep Learning based Object tracking," by Satya Mallick [Online]. Available: https://www.learnopencv.com/goturn-deep-learning-based-object-tracking/, published 20180722.

The first solution, manual counting of telecom equipment by humans, is labour intensive, time-consuming, and as well as possibly inaccurate. The quality of the outcomes depends a lot on the experience of the individual performing the counting.

Regarding the second solution, i.e., counting techniques on object tracking, it is only applicable for video feeds, whereby adjacent frames are near-identical. However, such video feeds are typically not available in vehicle survey data of telecom equipment. Rather, in vehicle survey data of telecom equipment only high-resolution images are collected, whereby the adjacent images are rather far apart. Furthermore, an object tracking approach has been empirically evaluated on vehicle survey data, and it has been shown to be ineffective, since some telecom equipment could not be identified between frames. This results in inaccurate counting of the telecom equipment.

SUMMARY

Mobile devices such as aerial devices, for example, UAVs, have become increasingly popular in recent years, in particular for surveillance, photography, ground monitoring, spraying pesticides, emergency or rescue operations, and the like. As mobile devices become mainstream with numerous advances in recent years, they become ideal candidates for an increasing number of tasks, including inspection of equipment such as telecom equipment, since their degree of autonomy and capabilities enable performance of dangerous and critical tasks with safety, precision, and yet in a cost effective manner.

Collecting information about equipment e.g. mounted on structures, such as radio towers, is a task that can e.g. be done in an automated way, by allowing a device such as a mobile device, e.g. a UAV, to survey a radio site and let it autonomously identify and count the actual equipment pertaining the radio site. However, visual-only inspection with a mobile device is a very challenging task in image processing terms, and thus, without thorough manual inspection of recorded images, it is hard to distinguish the different objects or equipment in different images.

An object of embodiments herein is, therefore, to improve handling objects in images, for example, when counting objects on a structure, in an efficient manner. Thus, to reduce the manual work by human and also to provide accurate information of the objects on the structure, e.g. antennas, radio remote units (RRU), microwave units, or Tower Mounted Amplifiers (TMA), an artificial intelligence (AI) solution for out-door telecom structure inventory based on vehicle survey images is herein provided.

According to an aspect of embodiments herein, the object is achieved by a method performed by a computing device for handling an object in one or more recorded images of a structure. The computing device receives from one or more mobile devices, at least two recorded images of the structure. The computing device aligns the at least two recorded images vertically and/or horizontally based on the structure and/or an object in the at least two recorded images. The computing device further computes a location similarity of the object in the at least two recorded images by comparing location values of the object in the aligned at least two recorded images, and computes a visual similarity of the object in the at least two recorded images by comparing visual characteristics of the object in the aligned at least two recorded images. The computing device further determines whether the object is the same or not in the at least two recorded images based on the computed location similarity and the computed visual similarity.

According to a further aspect of embodiments herein, the object is achieved by providing a computing device for handling an object in one or more recorded images of a structure. The computing device is configured to receive from one or more mobile devices, at least two recorded images of the structure; and to align the at least two recorded images vertically and/or horizontally based on the structure and/or an object in the at least two recorded images. The computing device is further configured to compute a location similarity of the object in the at least two recorded images by comparing location values of the object in the aligned at least two recorded images; and to compute a visual similarity of the object in the at least two recorded images by comparing visual characteristics of the object in the aligned at least two recorded images. The computing device is configured to determine whether the object is the same or not in the at least two recorded images based on the computed location similarity and the computed visual similarity.

It is furthermore provided herein a computer program product comprising instructions, which, when executed on at least one processor, cause the at least one processor to carry out any of the methods above, as performed by the computing device. It is additionally provided herein a computer-readable storage medium, having stored thereon a computer program product comprising instructions which, when executed on at least one processor, cause the at least one processor to carry out any of the methods above, as performed by the computing device.

Embodiments herein thus provide an automated solution to identify and, for example, count objects from raw vehicle survey images. Computer vision techniques may be applied on top of telecom object detection models including image alignment and object matching techniques to detect duplications across images or image frames. For each detected object, previous images are compared to determine whether the object has, for example, been counted by estimating visual and location similarity.

This is a cost-effective and fast procedure since this is an automated solution, and it does not assume consecutive image sequences. As a result, it may, for example, be used for telecom equipment counting for vehicle survey images. By using visual and location similarity, embodiments herein detect whether the object in recorded images has been detected in previous images, which detection is facilitated by aligning vertically and/or horizontally based on the structure and/or the object in the images.

BRIEF DESCRIPTION OF THE DRAWINGS

Examples of embodiments herein are described in more detail with reference to the attached drawings in which.

DETAILED DESCRIPTION

Figure 1:
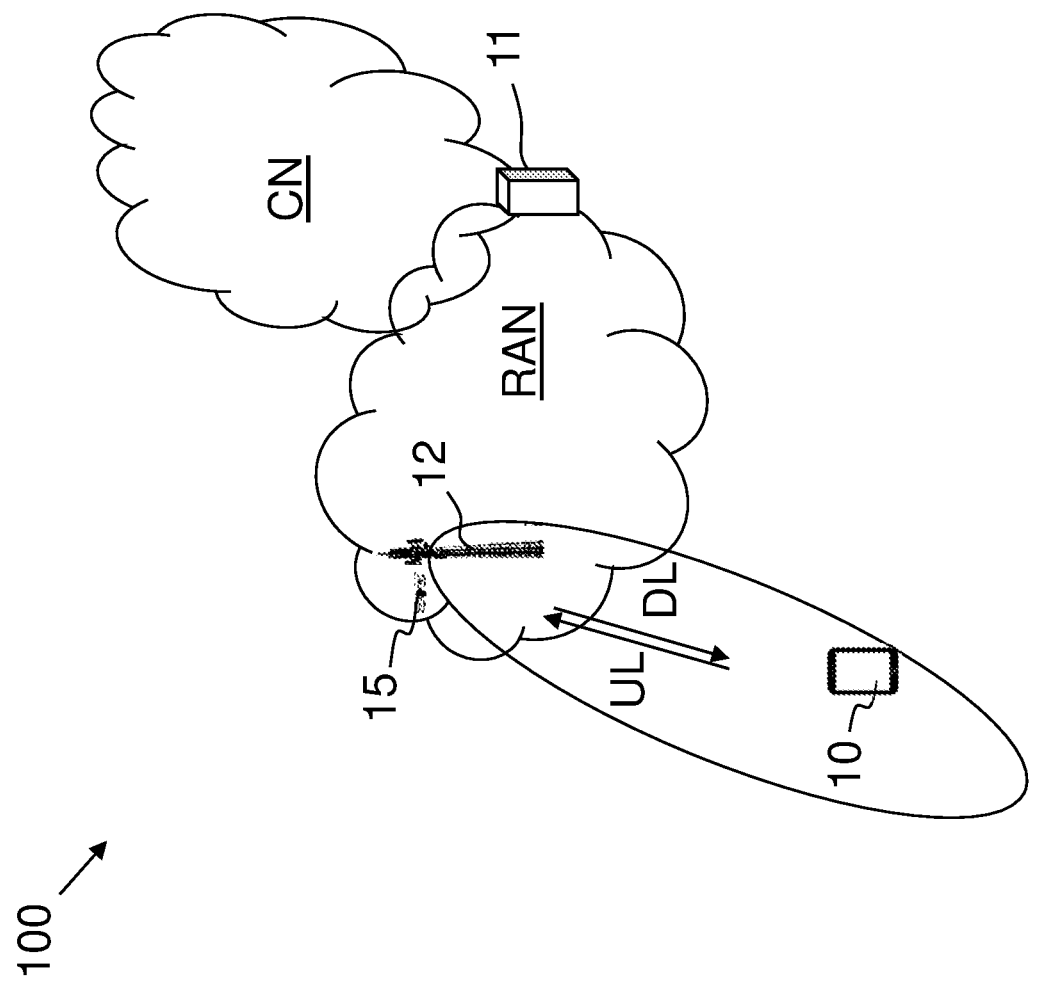
FIG. 1 is a schematic overview depicting an architecture according to embodiments herein.

FIG. 1 is a schematic overview depicting a communications network 100 wherein embodiments herein may be implemented. The communications network 100 comprises one or more RANs and one or more CNs. The communications network 100 may use any technology such as 5G New Radio (NR) but may further use a number of other different technologies, such as, Wi-Fi, long term evolution (LTE), LTE-Advanced, wideband code division multiple access (WCDMA), global system for mobile communications/enhanced data rate for GSM evolution (GSM/EDGE), worldwide interoperability for microwave access (WiMAX), or ultra mobile broadband (UMB), just to mention a few possible implementations.

The communications network 100 may comprise one or more radio network nodes 12 providing radio coverage over a respective geographical area by means of antennas or similar. Thus the radio network node 12 may serve a user equipment (UE) 10 such as a mobile phone or similar. The geographical area may be referred to as a cell, a service area, beam or a group of beams. The radio network node 12 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Mobile device to Mobile device (D2D) communication, or any other network unit capable of communicating with a UE within the cell served by the radio network node 12 depending e.g. on the radio access technology and terminology used.

A mobile device 15 is configured to be used to inspect objects, e.g. antennas, RRUs, microwave units, and/or TMAs, on a structure or the structure such as an antenna unit, or a radio tower. Other structures may be any type of tower or building with e.g. mounted objects also referred to as equipment. The mobile device 15 is configured to record one or more images of the structure.

The communications network 100 further comprises a computing device 11 such as a server, computer or any computing device for collecting and controlling different tasks in the communications network 100. The computing device 11 may comprise any network node, such as an edge node, a core network node, a radio network node or similar, configured to perform computations or similar in the communications network 100. The method herein may be for example be performed by a computer or a server in a data centre for processing image data.

Embodiments herein relate to a handling object such as a similarity function or a counting function to aid the mobile device 15 to identify object or objects in recorded images, for example, for counting objects at a site. The computing device 11 or a counting agent at the computing device 11 obtains a number of images from one or more mobile devices. According to embodiments herein the computing device 11 handles the data of the images to determine whether an object in a recorded image is the same as an object in another recorded image. Thus, providing a manner of handling objects in recorded images in an efficient and accurate way.

Figure 2:
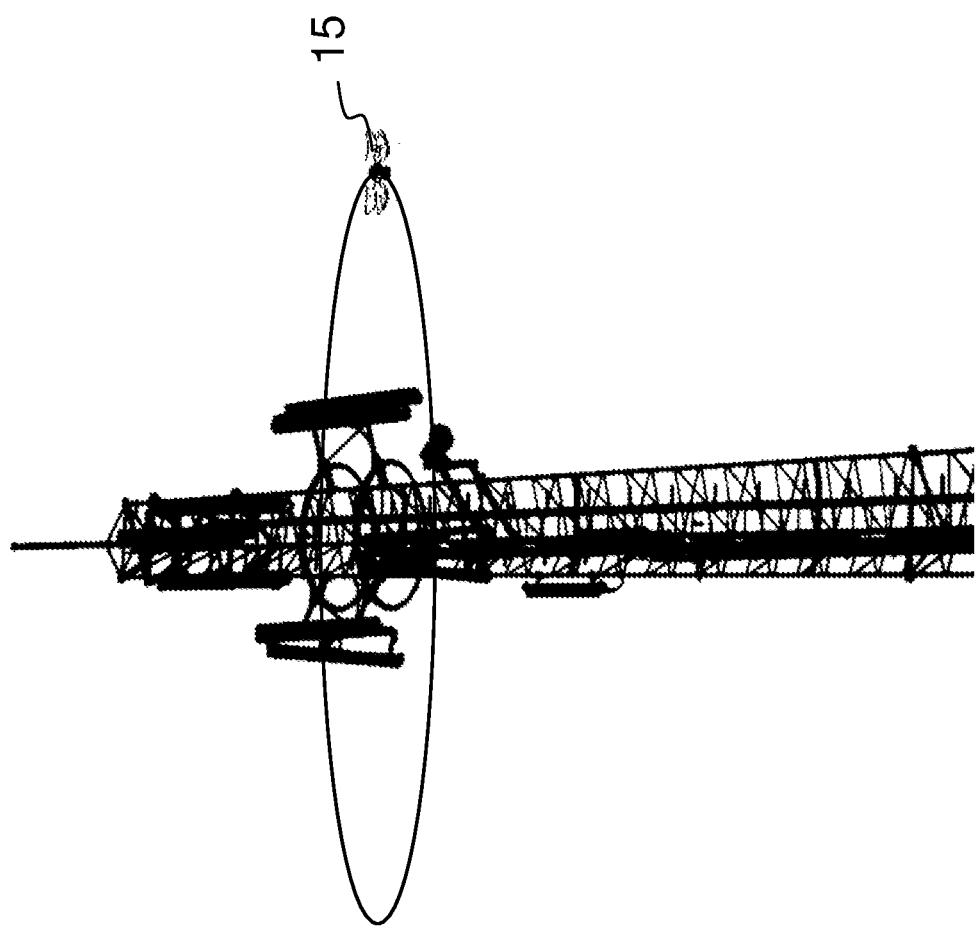
FIG. 2 is a schematic overview depicting a mobile device circling a structure in an orbit.

FIG. 2 is a schematic overview depicting the mobile device 15 circling the structure (the tower) in an orbit around a structure such as a radio tower, a building with radio equipment or similar. According to embodiments herein the mobile device records images and provides these to the computing device 11. The mobile device 15 may record the images with an interruption in time between the recording of the images, i.e., not consecutive image sequences such as video recordings. These images are then handled by the computing device 11 to determine whether or not an object in one image is the same object as an object in a previous image. This may be used for counting the objects of, for example, a radio tower.

Figure 3:
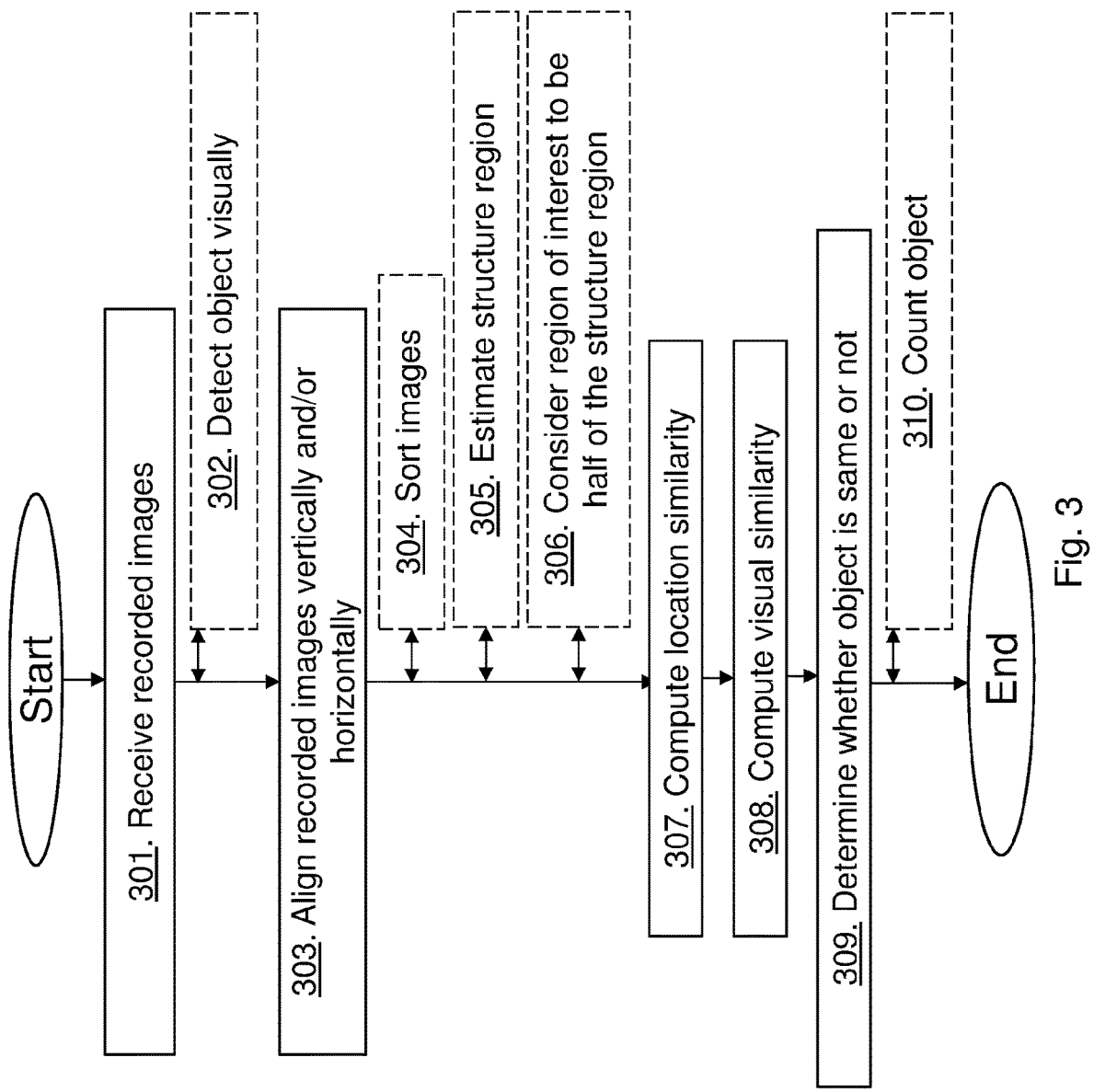
FIG. 3 is a schematic flowchart depicting a method performed by a computing device according to embodiments herein.

The method actions performed by the computing device 11 for handling an object in one or more recorded images of a structure, for example counting equipment on a radio tower, according to embodiments will now be described with reference to a flowchart depicted in FIG. 3. The actions do not have to be taken in the order stated below, but may be taken in any suitable order. Actions performed in some embodiments are marked with dashed boxes.

Action 301. The computing device 11 receives from one or more mobile devices such as the mobile device 15, at least two recorded images of the structure.

Action 302. The computing device 11 may detect the object visually in each recorded image, taken in an orbit around the structure, to obtain a bounding box of the detected object in each recorded image. A machine learning (ML) model may be used to identify objects in an image processing machine learning model. Bounding box is a line surrounding the detected object in a recorded image. For example, if there are, for example, N detected objects, one would have N bounding boxes in total. For each bounding box i, values $x_{i\_min}$, $x_{i\_max}$, $y_{i\_min}$ and $y_{i\_max}$ are obtained. Then, $x_{min}$, $x_{max}$, $y_{min}$, $y_{max}$ are calculated as follows:

$$\begin{cases} x_{min} = \min(x_{1\_min}, x_{2\_min}, \ldots, x_{N\_min}) \\ x_{max} = \max(x_{1\_max}, x_{2\_max}, \ldots, x_{N\_max}) \\ y_{min} = \min(y_{1\_min}, y_{2\_min}, \ldots, y_{N\_min}) \\ y_{max} = \max(y_{1\_max}, y_{2\_max}, \ldots, y_{N\_max}) \end{cases}$$

Action 303. The computing device 11 aligns the at least two recorded images vertically and/or horizontally based on the structure and/or the, for example, detected, object in the at least two recorded images. For example, the computing device 11 may perform a coarse vertical structure alignment among the at least two recorded images within the orbit. The computing device 11 may perform the aligning by performing one or more of the following: the computing device 11 may estimate a centre of each detected structure object in one recorded image using the bounding box; the computing device 11 may get an average centre location from the centre of each detected object and define it as the centre of each recorded image; the computing device 11 may get the average centre location from each recorded image and define it as the centre of the structure in the current orbit; and/or the computing device 11 may estimate an offset between each recorded image and orbit, which will be used for calculating the similarity between a new detected object and an existing object.

Action 304. The computing device 11 may sort, in an order, the at least two recorded images by view angles around the structure. The images may be sorted in an order based on the angles and this may be performed by either numerically marking them or alphabetically marking each image.

Action 305. The computing device 11 may estimate a structure region in the at least two recorded images according to the sorted order.

Action 306. The computing device 11 may consider a region of interest to be half of the structure region, and then based on the region of interest, select an object or objects with a centroid that is within the region of interest.

Action 307. The computing device 11 computes a location similarity of the object in the at least two recorded images by comparing location values of the object in the aligned at least two recorded images. It should be noted that the computing device 11 may estimate a centre of each recorded image individually, to preserve the location similarity between neighbouring recorded images. The computing device 11 may compute the location similarity by performing one or more of the following: the computing device 11 may compute the centre of each bounding box; the computing device 11 may update the centre on the basis of an offset; and/or the computing device may compute the location similarity by any distance measurement between the centres of the bounding boxes.

Action 308. The computing device 11 computes a visual similarity of the object in the at least two recorded images by comparing visual characteristics of the object in the aligned at least two recorded images. The computing device 11 may execute a machine learning (ML) model with the at least two recorded images as an input to compute the visual similarity. Thus, the ML model may be used to compute the visual similarity e.g. a neural network model such as for example a Visual Geometry Group (VGG) network and residual neural network (ResNet) or similar.

Action 309. The computing device 11 determines whether the object is the same or not in the at least two recorded images based on the computed location similarity and the computed visual similarity.

Action 310. The computing device 11 may count the object as a new object with the proviso that the object is determined to not be the same in the at least two recorded images (determined in action 309).

Figure 4:
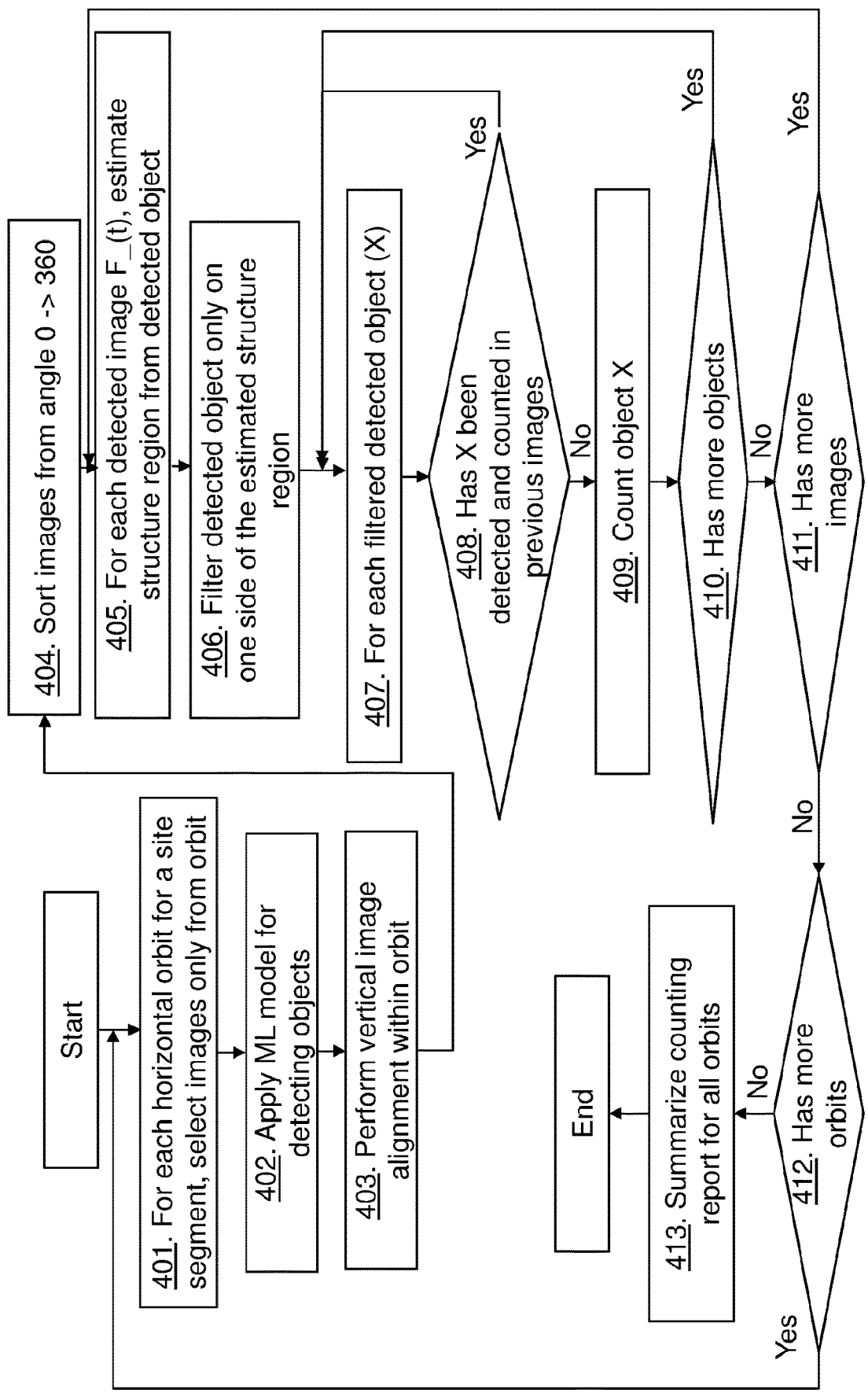
FIG. 4 is a schematic flowchart depicting a method performed by a computing device according to embodiments herein.

FIG. 4 is a schematic overview of a scenario for a solution assuming that vehicle images, also referred to as frames or image frames, for a particular site of interest for counting objects, also referred to as equipment, are collected in a centralized solution. The method below explains details of how automated counting of objects such as telecom equipment can be performed. FIG. 4 presents the overview of the method. The structure is exemplified as a tower in this example.

For Action 401, the computing device 11 may for each horizontal orbit for a site segment, select images only from orbit, i.e. iterate on each horizontal orbit. This is feasible, since the images are collected and grouped in a particular folder during data collection. Then, images are filtered only from that particular folder.

In Action 402, an availability of trained telecom equipment detection model is assumed, thus, an ML model for detecting objects is applied. ML models for object detection may be You only look once version 3 (Yolov3), or Faster Region Based Convolutional Neural Networks (RCNN). The ML model may have the capability of accurately detecting all telecom equipment clearly visible in the image. Clearly visible means e.g. a threshold such as that at least 70% of the object is not occluded, e.g., by other objects or cables. This is controlled by the data annotation process for the model. For all images in the orbit, the ML model may be applied to obtain bounding boxes of detected objects, see FIG. 6.

In Action 403, based on detected bounding boxes of e.g. sector antennas, a coarse vertical telecom tower alignment may be performed among all the images within the orbit. The rationale is that sometimes the mobile device 15 moves up/down more or less vertically, while performing horizontal orbit capturing around the tower. Such vertical movement between neighbouring images will greatly affect the similarity measurement for the detected object. To address this problem, the following steps are proposed to roughly align each image with its neighbouring images.

a) Estimate the center (Antenna_$C_i$) of each detected antenna in one image using the bounding box ($x_{min}$, $x_{max}$, $y_{min}$, $y_{max}$)
b) Get the average center location from Antenna_$C_i$ and define it as the center of each image (Frame_$C_j$).
c) Get the average center location from each Frame_$C_j$ and define it as the center of tower in the current orbit. (Orbit_C).
d) The offset (offset_$C_j$) between each image and Orbit_C is estimated by offset_$C_j$=Frame_$C_j$−Orbit_C, which will be used in the following steps for calculating the similarity between the new detected equipment and existing equipment.

An antenna may be chosen as it is the biggest and most frequent object in the image, which can help roughly predict the location of the entire structure. The center of each image is estimated individually, which can preserve the location similarity between neighbouring images.

For Action 404, the computing device 11 may monotonically sort the images according to viewing angles from 0 to 359 degrees. It does not matter which angle specifically being 0 or 359 as long as it is consistent. This can be performed by sorting on image names, since the collected images may be sorted by angles.

In Action 405, for each image (with object detection results) according to the sorted order in the previous action, the structure region is estimated. This can be done by estimating the covering bounding box from all detected objects ($x_{min}$, $x_{max}$, $y_{min}$, $y_{max}$). To be more specific, if there are, for example, N detected objects, one would have N bounding boxes in total. For each bounding box i, values $x_{i\_min}$, $x_{i\_max}$, $y_{i\_min}$ and $y_{i\_max}$ are obtained. Then, $x_{min}$, $x_{max}$, $y_{min}$, $y_{max}$ are calculated as follows:

$$\begin{cases} x_{min} = \min(x_{1\_min}, x_{2\_min}, \ldots, x_{N\_min}) \\ x_{max} = \max(x_{1\_max}, x_{2\_max}, \ldots, x_{N\_max}) \\ y_{min} = \min(y_{1\_min}, y_{2\_min}, \ldots, y_{N\_min}) \\ y_{max} = \max(y_{1\_max}, y_{2\_max}, \ldots, y_{N\_max}) \end{cases}$$

For Action 406, from the estimated structure region in the previous action, the region of interest is considered to be half of the structure region. Thus, the computing device 11 may filter detected object only on one side of the estimated structure region. It can be left or right half of the structure, which is feasible as long as it is consistently executed. Then, based on the region of interest, only detected objects are filtered whereby its centroid (of the detected box) is within that region.

In Action 407, iteration on each detected object X is performed satisfying the criterion mentioned in the previous action.

For Action 408, the computing device 11 performs a check whether this detected object X has been detected in previous k images ($F_{t-1}$, $F_{t-2}$, $F_{t-3}$, . . . , $F_{t-k}$). See FIG. 5.

To set the appropriate k (the number of historical images to consider), the principle of covering of about ~60 viewing angles is used. Then, one may estimate k=(60/360)*#collected images per orbit.

If the object has been detected (and counted) in previous images, continue to the next object. In Action 409, if the object has not been detected (and counted earlier), the object is counted by increment a value of one for detected equipment type, Equipment_type(X)++. This is continued until all detected objects in the image are checked, action 410, whereby next image is checked, action 411, and later for the next horizontal orbit, action 412. When all horizontal orbits are done, in Action 413, a summary report is generated by summing up the count of objects from different horizontal orbits.

Figure 5:
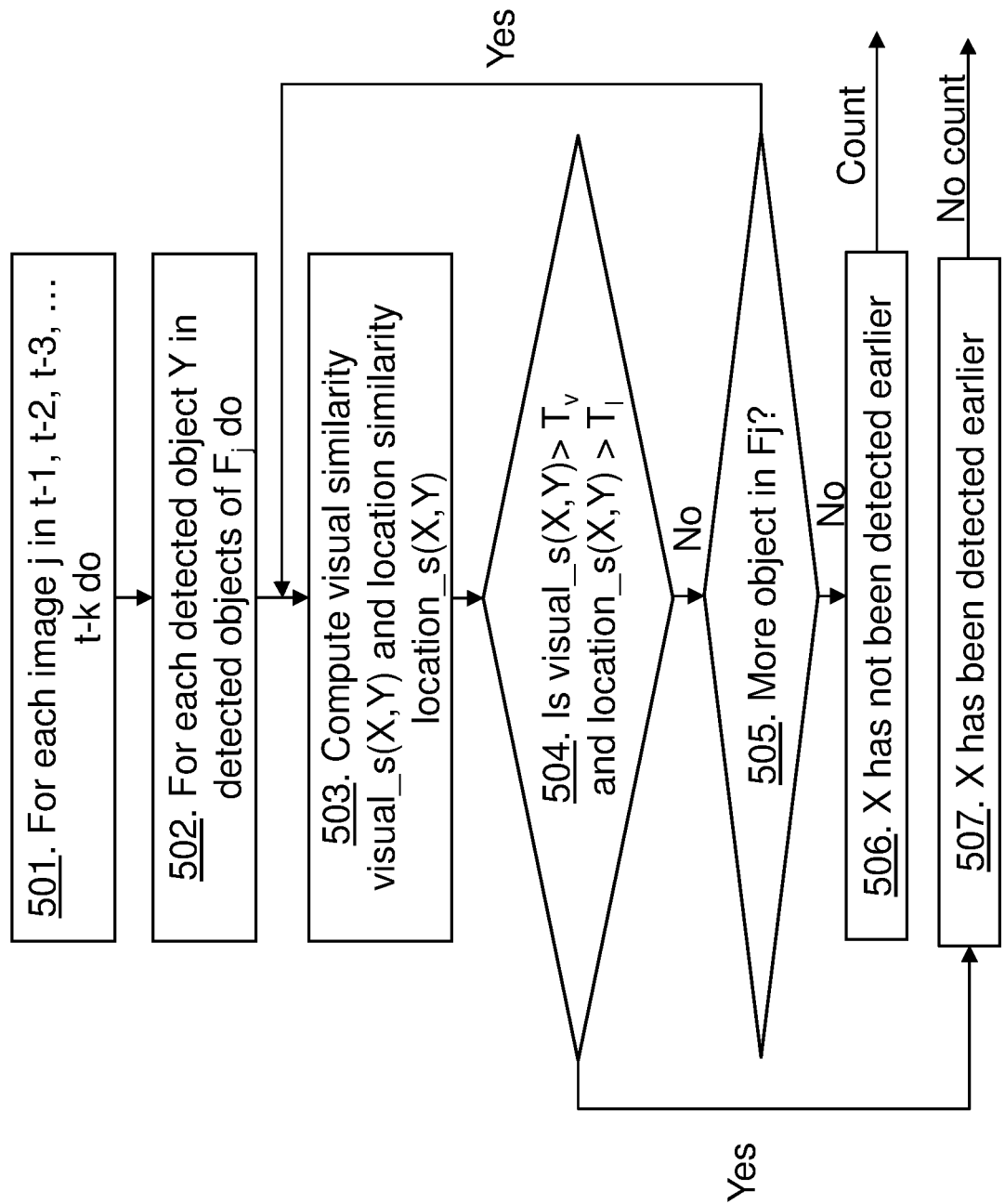
FIG. 5 is a schematic flowchart depicting a method performed by a computing device according to embodiments herein.

FIG. 5 shows an example of a check whether a detected object has been detected in previous images, see action 408 above. For the first image considered in the current orbit, all the detected objects will be counted by the types respectively. For example, there are $n_a$ antennas and $n_t$ tower mounted amplifiers (TMA). In Action 501, an iteration over previous k images ($F_{t-1}$, $F_{t-2}$, $F_{t-3}$, . . . , $F_{t-k}$) is executed with trained object detection models. For each iteration, a check is performed for each detected object Y in Action 502, which has been counted in the previous k images. Herein one may measure the similarities between new object and all the objects of the same type counted in previous k images.

In Action 503, two similarities are computed: visual similarity, visual_s(X,Y), which describes if the existing counted object contains similar visual characteristics in comparison with the target object; and location (distance) similarity, location_s(X,Y), which provides an additional position information for aligned images to estimate any similar objects or equipment. Combining both kinds of estimation will produce a final decision on whether object X has been detected earlier or not.

$$\begin{cases} X \text{ has been counted,} & \text{if visual\_s}(X, Y) > T_v \text{ and} \\ & \text{location\_s}(X, Y) > T_l \\ X \text{ has not been counted,} & \text{otherwise} \end{cases}$$

For visual similarity, embodiments herein may use some backbone ML model such as a convolutional neural network (CNN) to extract higher-level features of the cropped object and to compute the distance on a new feature map. To be more specific, the target object X and the existing counted object Y from the same type, e.g. two remote radio units (RRU), are first roughly extracted from the structure by using the detected bounding box. These two RRUs will go through the same CNN, for example a Visual Geometry Group (VGG) network and residual neural network (ResNet). Then, the convolutional/higher-level features, ConvFeatures_X and ConvFeatures_Y, are stored in the Fully connected layer, respectively. The visual similarity, visual_s(X,Y), is computed by e.g. a Euclidean distance of convolutional features of X and Y:

$$\text{visual\_s}(X, Y) = -\sqrt{\sum_{i=0}^{n}(\text{ConvFeatues\_X}_i - \text{ConvFeatues\_Y}_i)^2}$$

The location similarity
is estimated by the following actions assuming Y was counted in the t-j image:
a) Compute the center of each bounding box, Center_X and Center_Y.
b) Update the center on the basis of the offset in Action 403 above. Center_X=Center_X+offset_C$_t$, and Center_Y=Center_Y+offset_C$_{t-j}$.
c) Location similarity, location_s(X,Y), is obtained by:

$$\text{location\_s}(X, Y) = \\ -\sqrt{\sum_{i=0}^{n}(\text{Center\_X}_x - \text{Center\_Y}_x)^2 + (\text{Center\_X}_y - \text{Center\_Y}_y)^2}$$

The threshold of visual_s(X,Y), $T_v$, and location_s(X,Y), $T_i$, may be estimated from a supervised method by using many labelled and counted sites. Specifically, for each orbit, a set of matched/unmatched pairs may be manually annotated. For example, for an antenna in the current image, each antenna shown in the neighbouring images is annotated as matched or unmatched pairs with this antenna. Using those labelled pairs from different sites, a supervised learning solution may be applied to optimize $T_v$ and $T_i$ for distinguishing matched and unmatched groups. This may be denoted as a Hyper parameter estimation.

Action 504. The computing device 11 may then compare the visual_s(X,Y) with the $T_v$, and the location_s(X,Y) with the $T_i$.

Thus: visual_s(X,Y)>$T_v$, and the location_s(X,Y)≥$T_i$, see action 507;
visual_s(X,Y)≥$T_v$, and the location_s(X,Y)≤$T_i$, see action 505;
visual_s(X,Y)≤$T_v$, and the location_s(X,Y)>$T_i$, see action 505;
visual_s(X,Y)≤$T_v$, and the location_s(X,Y)≤$T_i$, see action 505.

Action 505. If the location similarity and/or the visual similarity is below the threshold the computing device 11 checks if there are any more objects in the image and performs the process again.

Action 506. The computing device 11 may then determine that when the visual_s(X,Y) is not above $T_v$, and/or the location_s(X,Y) is not above the $T_i$, the object X has not been detected earlier, and the object X is counted.

Action 507. The computing device 11 may then determine that when the visual_s(X,Y) is above $T_v$, and the location_s (X,Y) is above the $T_i$, the object X has been detected earlier, and the object X is not counted.

Embodiments herein relate to a solution that is cost-effective and fast, since this is an automated solution. For such a solution, it does not require manual working hours and time consuming operation from human workers. It is accurate, since it does not depend on individual human experience performing the counting from raw images, and it is applicable to vehicle survey images for structure use cases, because it does not require video sequences. It only needs images, or image frames, from different angles.

Figure 6:
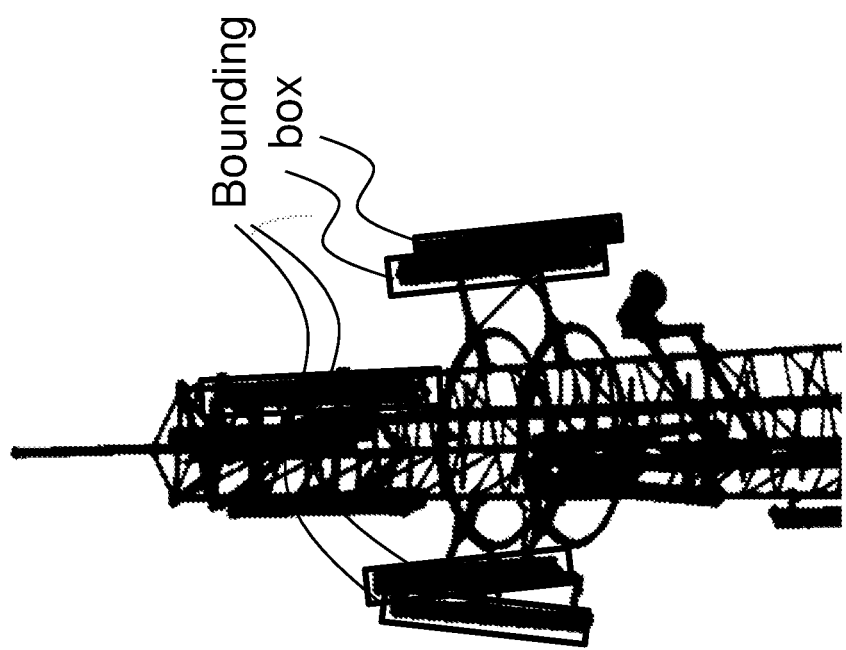
FIG. 6 is a schematic overview depicting a bounding box around an object on a structure according to embodiments herein.

FIG. 6 discloses schematically how an object is detected visually in the at least two recorded images in an orbit around the structure to obtain a bounding box of the detected object. This may use an ML model that has the capability of accurately detecting all objects clearly visible in the image.

Figure 7:
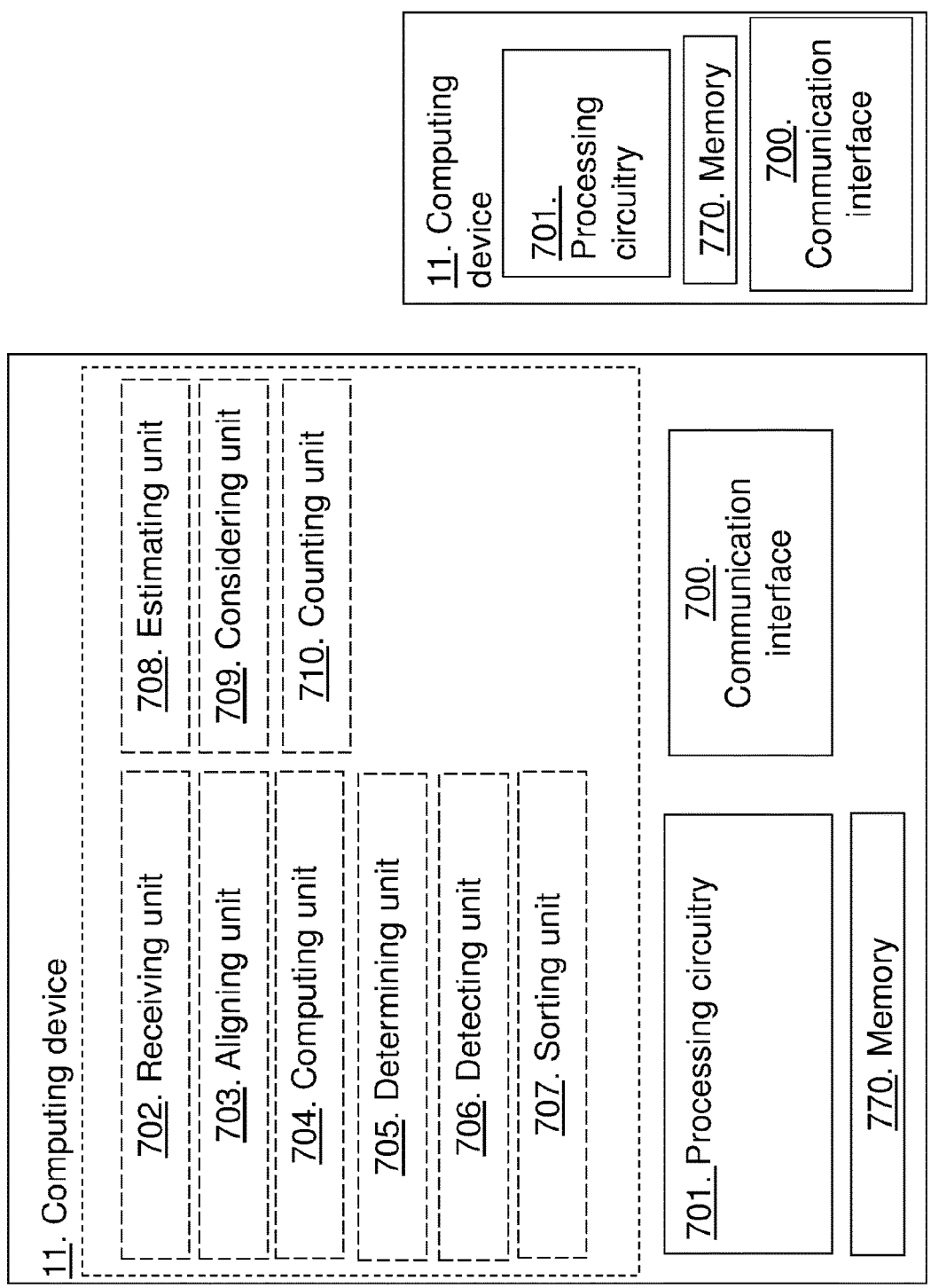
FIG. 7 is a block diagram depicting a computing device according to embodiments herein.

To perform the method actions mentioned above for handling the object in one or more recorded images of the structure e.g. an object associated with telecommunications such as radio equipment, the computing device 11, depicted in two embodiments in FIG. 7, may comprise an arrangement. The object may be mounted on a structure such as a radio tower.

The computing device 11 may comprise a communication interface 700 depicted in FIG. 7, configured to communicate e.g. with the communications network 100 also referred to as a cloud network. The communication interface 700 may comprise a wireless receiver (not shown) and a wireless transmitter (not shown) and e.g. one or more antennas. The embodiments herein may be implemented through a processing circuitry 701 configured to perform the methods herein. The processing circuitry may comprise one or more processors. Thus, it is herein provided the computing device 11 e.g. comprising processing circuitry and memory, said memory comprising instructions executable by said processing circuitry whereby said computing device 11 is operative to perform the methods herein.

The computing device 11 may comprise a receiving unit 702, e.g. a receiver or a transceiver with one or more antennas. The processing circuitry 701, the computing device 11 and/or the receiving unit 702 is configured to receive from one or more mobile devices, at least two recorded images of the structure.

The computing device 11 may comprise an aligning unit 703. The processing circuitry 701, the computing device 11 and/or the aligning unit 703 is configured to align the at least two recorded images vertically and/or horizontally based on the structure and/or the (detected) object in the at least two recorded images.

The computing device 11 may comprise a computing unit 704. The processing circuitry 701, the computing device 11 and/or the computing unit 704 is configured to compute the location similarity of the object in the at least two recorded images by comparing location values of the object in the aligned at least two recorded images. The processing circuitry 701, the computing device 11 and/or the computing unit 704 is further configured to compute the visual similarity of the object in the at least two recorded images by comparing visual characteristics of the object in the aligned at least two recorded images. The processing circuitry 701, the computing device 11 and/or the computing unit 704 may be configured to execute the ML model with the at least two recorded images as an input to compute the visual similarity.

The computing device 11 may comprise a determining unit 705. The processing circuitry 701, the computing device 11 and/or the determining unit 705 is configured to determine whether the object is the same or not in the at least two recorded images based on the computed location similarity and the computed visual similarity.

The computing device 11 may comprise a detecting unit 706. The processing circuitry 701, the computing device 11 and/or the detecting unit 706 may be configured to detect the object visually in each recorded image, taken in the orbit around the structure, to obtain the bounding box of detected object in each recorded image.

The processing circuitry 701, the computing device 11 and/or the aligning unit 703 may be configured to align the at least two recorded images by performing a coarse vertical structure alignment among the at least two recorded images within the orbit. The processing circuitry 701, the computing device 11 and/or the aligning unit 703 may be configured to align the at least two recorded images by performing one or more of the following:

estimating a centre of each detected object in one recorded image using the bounding box;
getting an average centre location from the centre of each detected object and define it as the centre of each recorded image;
getting the average centre location from each recorded image and define it as the centre of structure in the current orbit; and/or
estimating an offset between each recorded image and orbit, which will be used for calculating the similarity between the new detected object and the existing object.

The processing circuitry 701, the computing device 11 and/or the aligning unit 703 may be configured to estimate the centre of each recorded image individually, to preserve the location similarity between neighbouring recorded images.

The processing circuitry 701, the computing device 11 and/or the computing unit 704 may be configured to compute the location similarity by performing one or more of the following:

computing the centre of each bounding box;
updating the centre on the basis of an offset; and/or
computing the location similarity by any distance measurement between the centres of the bounding boxes.

The computing device 11 may comprise a sorting unit 707. The processing circuitry 701, the computing device 11 and/or the sorting unit 707 may be configured to sort, in the order, the at least two recorded images by view angles around the structure.

The computing device 11 may comprise an estimating unit 708. The processing circuitry 701, the computing device 11 and/or the estimating unit 708 may be configured to estimate the structure region in the at least two recorded images according to the sorted order.

The computing device 11 may comprise a considering unit 709. The processing circuitry 701, the computing device 11 and/or the considering unit 709 may be configured to consider the region of interest to be half of the structure region, and then based on the region of interest, to select an object or objects with a centroid that is within the region of interest.

The computing device 11 may comprise a counting unit 710. The processing circuitry 701, the computing device 11 and/or the counting unit 710 may be configured to count the object as a new object with the proviso that the object is determined to not be the same in the at least two recorded images.

The embodiments herein may be implemented through a respective processor or one or more processors, such as a processor of the processing circuitry 701 in the computing device 11 depicted in FIG. 7, together with a respective computer program code for performing the functions and actions of the embodiments herein. The program code mentioned above may also be provided as a computer program product, for instance in the form of a data carrier carrying computer program code for performing the embodiments herein when being loaded into the computing device 11. One such carrier may be in the form of a universal serial bus (USB) stick, a disc or similar. It is however feasible with other data carriers such as any memory stick. The computer program code may furthermore be provided as pure program code on a server and downloaded to the computing device 11.

The computing device 11 may further comprise a memory 770 comprising one or more memory units to store data on. The memory comprises instructions executable by the processor. The memory 770 is arranged to be used to store e.g. measurements, photos, location information, ML models, meta data, instructions, configurations and applications to perform the methods herein when being executed in the computing device 11.

Those skilled in the art will also appreciate that the units in the computing device 11 mentioned above may refer to a combination of analogue and digital circuits, and/or one or more processors configured with software and/or firmware, e.g. stored in the computing device 11, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 790 comprises instructions, which when executed by the respective at least one processor, cause the at least one processor of the computing device 11 to perform the actions above.

In some embodiments, a carrier 780 comprises the computer program 790, wherein the carrier 780 is one of an electronic signal, an optical signal, an electromagnetic signal, a magnetic signal, an electric signal, a radio signal, a microwave signal, or a computer-readable storage medium.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method of generating a telecom equipment inventory with respect to a telecom structure of a communications network, the method performed by a computing device and comprising:
receiving a plurality of images captured by an unmanned aerial vehicle (UAV) during one or more orbits by the UAV around the telecom structure;
processing the plurality of images to detect items of telecom equipment present on the telecom structure; and
determining a count of unique items of telecom equipment present on the telecom structure by comparing a visual similarity and a location similarity of detected items across the plurality of images, to avoid duplicative counting of a same item that appears in more than one of the images;
wherein comparing the visual similarity and the location similarity of detected items across the plurality of images comprises comparing those images that correspond to the same orbit and further correspond to a same side or a same vertical region of the telecom structure, the visual similarity being a comparison of visual characteristics of objects detected in the respective images, and the location similarity being a comparison of location values determined for objects detected in the respective images.

2. The method according to claim 1, wherein receiving the plurality of images comprises receiving the plurality of images from a network node of the communications network, and wherein the UAV transmits the plurality of images to the communications network.

3. The method according to claim 1, wherein the computing device is a computer server included in the communications network.

4. The method according to claim 1, wherein the telecom structure is a radio tower, and wherein the plurality of images correspond to multiple horizontal orbits by the UAV, each horizontal orbit corresponding to a respective vertical region of the radio tower, and wherein the method includes processing the plurality of images on a per-orbit basis, to detect the unique items of radio equipment present in each vertical region of the radio tower.

5. The method according to claim 1, wherein the one or more orbits comprise two or more orbits, each orbit performed at a different elevation with respect to the telecom structure, and wherein comparing those images that correspond to the same side or the same vertical region of the telecom structure includes performing a vertical alignment of such images to obtain vertically aligned images and using the vertically aligned images for the comparison.

6. The method according to claim 1, wherein processing the plurality of images to detect items of telecom equipment present on the telecom structure comprises processing the images via a machine learning (ML) algorithm trained to recognize one or more types of telecom equipment.

7. The method according to claim 1, wherein the plurality of images comprises at least one set of images, each set corresponding to a horizontal orbit around the telecom structure at a respective elevation, and wherein processing the plurality of images comprises performing the processing on a per-set basis by:
  detecting items of telecom equipment on a per-image basis;
  performing a vertical image alignment of the images in the set;
  sorting the vertically aligned images with respect to orbital angle; and
  comparing the visual similarity and the location similarity of the detected items of telecom equipment, to determine the number of unique items of telecom equipment depicted in the set of images.

8. A computing device configured for generating a telecom equipment inventory with respect to a telecom structure of a communications network, the computing device comprising:
  a communication interface configured to receive a plurality of images captured by an unmanned aerial vehicle (UAV) during one or more orbits by the UAV around the telecom structure of the communications network; and
  processing circuitry configured to:
    process the plurality of images to detect items of telecom equipment present on the telecom structure; and
    determine a count of unique items of telecom equipment present on the telecom structure by comparing a visual similarity and a location similarity of detected items across the plurality of images, to avoid duplicative counting of a same item that appears in more than one of the images;
    wherein comparing the visual similarity and the location similarity of detected items across the plurality of images comprises comparing those images that correspond to the same orbit and further correspond to a same side or a same vertical region of the telecom structure, the visual similarity being a comparison of visual characteristics of objects detected in the respective images, and the location similarity being a comparison of location values determined for objects detected in the respective images.

9. The computing device according to claim 8, wherein the communication interface receives the plurality of images from a network node of the communications network, based on the UAV transmitting the plurality of images to the communications network.

10. The computing device according to claim 8, wherein the computing device is a computer server included in the communications network.

11. The computing device according to claim 8, wherein the telecom structure is a radio tower, and wherein the plurality of images correspond to multiple horizontal orbits by the UAV, each horizontal orbit corresponding to a respective vertical region of the radio tower, and wherein the processing circuitry is configured to process the plurality of images on a per-orbit basis, to detect the unique items of radio equipment present in each vertical region of the radio tower.

12. The computing device according to claim 11, wherein the one or more orbits comprise two or more orbits, each orbit performed at a different elevation with respect to the telecom structure, and wherein, for comparing those images that correspond to the same side or the same vertical region of the telecom structure, the processing circuitry is configured to perform a vertical alignment of such images to obtain vertically aligned images and use the vertically aligned images for the comparison.

13. The computing device according to claim 8, wherein, for processing the plurality of images to detect items of telecom equipment present on the telecom structure, the processing circuitry is configured to process the images via a machine learning (ML) algorithm trained to recognize one or more types of telecom equipment.

14. The computing device according to claim 8, wherein the plurality of images comprises at least one set of images, each set corresponding to a horizontal orbit around the telecom structure at a respective elevation, and wherein, for processing the plurality of images, the processing circuitry performs the processing on a per-set basis based on being configured to:
  detect items of telecom equipment on a per-image basis;
  perform a vertical image alignment of the images in the set;
  sort the vertically aligned images with respect to orbital angle; and
  compare the visual similarity and the location similarity of the detected items of telecom equipment, to determine the number of unique items of telecom equipment depicted in the set of images.

* * * * *